United States Patent
Downey

(10) Patent No.: US 9,505,323 B2
(45) Date of Patent: *Nov. 29, 2016

(54) ADJUSTABLE BOAT SEAT HANDLES

(71) Applicant: Brunswick Corporation, Lake Forest, IL (US)

(72) Inventor: Kevin Downey, Rockford, MI (US)

(73) Assignee: Brunswick Corporation, Lake Forest, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/077,546

(22) Filed: Mar. 22, 2016

(65) Prior Publication Data

US 2016/0200227 A1 Jul. 14, 2016

Related U.S. Application Data

(63) Continuation of application No. 14/543,469, filed on Nov. 17, 2014.

(51) Int. Cl.
*A47C 1/00* (2006.01)
*B60N 2/44* (2006.01)
*B63B 29/04* (2006.01)

(52) U.S. Cl.
CPC ............... *B60N 2/442* (2013.01); *B63B 29/04* (2013.01); *B63B 2029/043* (2013.01)

(58) Field of Classification Search
CPC ........ A47C 7/402; A47C 1/031; A47C 3/03; A47C 1/0265; A47C 3/18; B63B 2029/043; B63B 29/06
USPC .................. 297/463.2, DIG. 4, 300.4, 303.3, 297/344.22; 114/363; 248/418, 131, 415; 403/322.4
See application file for complete search history.

(56) References Cited

U.S. PATENT DOCUMENTS

| | | | |
|---|---|---|---|
| 3,860,283 A | 1/1975 | Colautti | |
| 4,143,436 A | 3/1979 | Jones | |
| 4,400,038 A * | 8/1983 | Hosokawa | B60B 27/023 280/288 |
| 4,593,929 A | 6/1986 | Williams | |
| 4,645,462 A | 2/1987 | Fulton | |
| 4,889,385 A | 12/1989 | Chadwick et al. | |
| 5,328,247 A * | 7/1994 | Lovins | A47C 7/506 297/423.3 |
| 5,458,399 A | 10/1995 | Gezari et al. | |
| 5,470,038 A * | 11/1995 | Clark | A45B 5/00 248/156 |
| 5,474,360 A | 12/1995 | Chang | |
| 5,486,056 A * | 1/1996 | Thorn | A47C 1/027 297/354.12 |

(Continued)

OTHER PUBLICATIONS

United States Patent and Trademark Office, "Non-final Office Action," issued in connection with U.S. Appl. No. 14/543,469, dated Nov. 3, 2015, 18 pages.

(Continued)

*Primary Examiner* — Chi Q Nguyen
(74) *Attorney, Agent, or Firm* — Hanley, Flight & Zimmerman, LLC

(57) ABSTRACT

Adjustable boat seat handles are described. A described apparatus comprises a handle including a first portion rotatably coupled to a second portion via a pin disposed through corresponding bores of the first and second portions, where the first portion includes a hand grip, and the second portion is operatively coupled to an adjustment mechanism, where the first portion rotates in a first direction to fold relative to the second portion and the first and second portions rotate together in a second direction to operate the adjustment mechanism.

20 Claims, 4 Drawing Sheets

(56) References Cited

U.S. PATENT DOCUMENTS

| | | | | |
|---|---|---|---|---|
| 5,664,904 | A * | 9/1997 | Hapgood | F16B 7/0433 248/230.4 |
| 5,865,560 | A * | 2/1999 | Mercat | B62K 25/02 301/124.2 |
| 5,882,076 | A * | 3/1999 | Garelick | A47C 15/004 248/411 |
| 5,884,887 | A * | 3/1999 | Garelick | A47B 13/021 248/416 |
| 6,082,680 | A * | 7/2000 | Woodward | B63B 29/06 114/363 |
| 6,095,611 | A | 8/2000 | Bar et al. | |
| 6,116,183 | A | 9/2000 | Crow et al. | |
| 6,155,154 | A * | 12/2000 | Hsu | B26D 7/2621 403/322.4 |
| 6,183,043 | B1 | 2/2001 | Nelson | |
| 6,460,818 | B1 * | 10/2002 | Garelick | B60N 2/0715 248/298.1 |
| 6,722,812 | B1 * | 4/2004 | Carletti | A61G 1/003 403/322.4 |
| 6,877,811 | B1 | 4/2005 | Garelick | |
| 6,941,621 | B1 * | 9/2005 | Wolforth | B63B 29/06 114/363 |
| 7,331,305 | B2 | 2/2008 | Garelick | |
| 7,351,000 | B2 * | 4/2008 | Meggiolan | B62K 25/02 280/279 |
| 2005/0082443 | A1 | 4/2005 | Hogle et al. | |
| 2005/0104435 | A1 | 5/2005 | Bain et al. | |
| 2009/0261642 | A1 | 10/2009 | Dickie | |
| 2012/0181831 | A1 | 7/2012 | Meier et al. | |

OTHER PUBLICATIONS

United States Patent and Trademark Office, "Notice of Allowance and Fee(s) Due" issued in connection with U.S. Appl. No. 14/543,469, dated Mar. 11, 2016, 17 pages.

United States Patent and Trademark Office, "Notice of Allowance and Fee(s) Due," issued in connection with U.S. Appl. No. 14/543,469, dated Jul. 26, 2016, 11 pages.

United States Patent and Trademark Office, "Non-final Office Action," issued in connection with U.S. Appl. No. 14/543,469, dated May 26, 2016, 9 pages.

* cited by examiner

ADJUSTABLE BOAT SEAT HANDLES

RELATED APPLICATION

This patent arises from a continuation of U.S. application Ser. No. 14/543,469, which was filed on Nov. 17, 2014, and is hereby incorporated herein by reference in its entirety.

FIELD OF THE DISCLOSURE

This disclosure relates generally to boat seat handles and, more particularly, to adjustable boat seat handles.

BACKGROUND

Boat seats may be adjusted using handles located beneath the seat. These handles may be used to actuate mechanisms that enable the boat seat to move vertically, swivel or slide. Typically, the handles are easily accessible to a user, thereby facilitating easy movement or adjustment of the seat. Some handles may be lever-type handles that enable the seat to be moved when pushed further from or pulled closer to the seat. Other handles may be rotated to enable movement of the seat.

DETAILED DESCRIPTION

Figure 1:
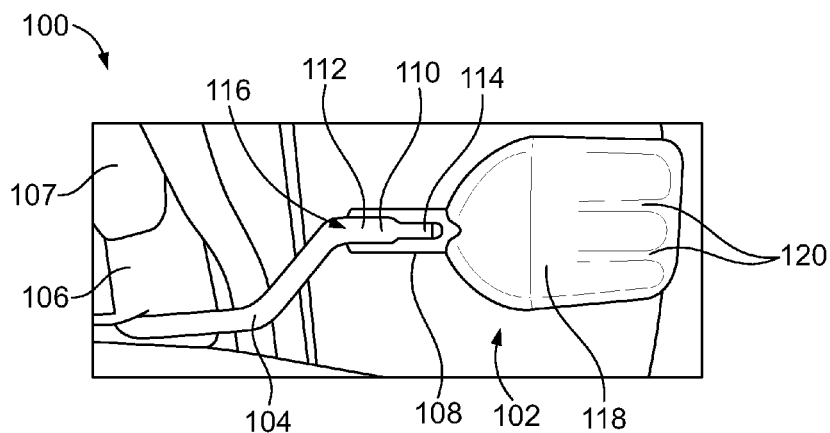
FIGS. 1-4 depict a known office chair handle.

FIG. 1 depicts a known office chair handle 100 having a hand grip 102 attached to a stem 104 of the handle 100. The stem 104 is attached to a base 106 of an office chair 107. The hand grip 102 has a hollow cylindrical portion 108 with an elongated opening slot 110 having a first end 112 and a second end 114. The first end 112 of the slot 110 is proximate an opening 116 of the cylindrical portion 108. The opening 116 is sized to receive the stem 104. The hand grip 102 includes a substantially flat portion 118 having curved ridges 120 on an end of the hand grip 102 opposite the cylindrical portion 108 to facilitate gripping of the hand grip 102. The hand grip 102 of the office chair handle 100 is pulled upward to enable adjustment of the chair.

Figure 2:
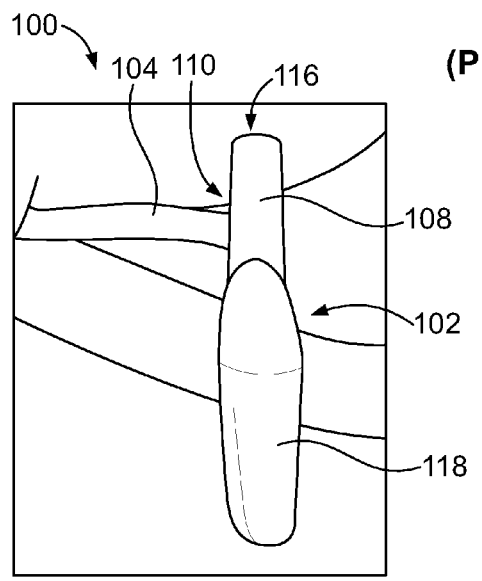

FIG. 2 depicts the office chair handle 100 in a folded position. The hand grip 102 is pushed downward to put the office chair handle 100 in the folded position. In particular, as the hand grip 102 is pushed downward, the stem 104 spreads the edges of the slot 110 apart to enable a portion of the stem 104 to exit the slot 110, thereby enabling the hand grip 102 to be rotated relative to the stem 104 as shown in FIG. 2. Additionally, the hand grip 102 of the handle 100 may be removed from the stem 104.

Figure 3:
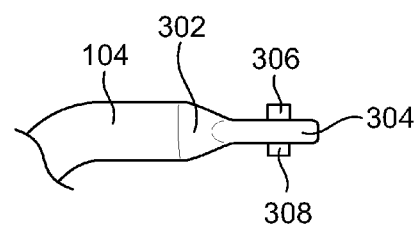

FIG. 3 shows the end of the stem 104 after the hand grip 102 has been removed. The end of the stem 104 has a tapered portion 302 that merges with a flattened portion 304 of the stem 104. When the hand grip 102 is pushed downward, the hand grip 102 rotates about the end of the stem 104. The flat portion 304 of the stem 104 also includes a first cylindrical protrusion 306 and a second cylindrical protrusion 308 to provide a pivot about which the hand grip 102 can rotate.

Figure 4:
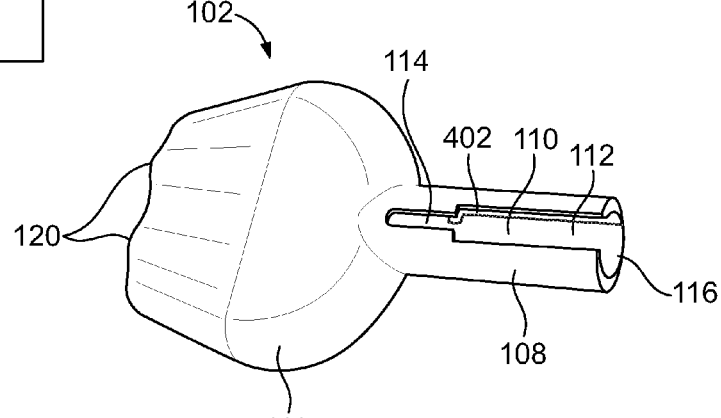

FIG. 4 shows the hand grip 102 removed from the stem 104. A groove 402 is formed in the cylindrical portion 108 of the hand grip 102 to receive the first and second cylindrical protrusions 306 and 308. The groove 402 acts as a guide for the first and second protrusions 306 and 308 to enable the hand grip 102 to slide on and off the stem 104. Additionally, the first and second cylindrical protrusions 306 and 308 are positioned at the end of the groove 402 when the hand grip 102 rotates about the end of the stem 104.

The example apparatus described herein is an adjustable boat seat handle, which may be attached to a seat base to be used with a variety of different seat types having varying seat depths. Additionally, some boat seats that may use this example apparatus include parts, such as bolsters, which may fold up or down. The example handle described herein enables a user of a boat seat to easily access the handle when needed and to stow the handle out of the way at other times. As described in greater detail below, the example handle has two portions that may be pivoted or rotated relative to each other. The first portion may be implemented as a rocker arm attached to the boat seat and the second portion may be a lever rotatably coupled to the rocker arm. In use, the lever of the example handle may be moved in a first direction to fully extend the handle such that the handle is easily accessible to a user for adjustment of a seat. The lever may be moved in a second direction to cause the lever to fold relative to the rocker arm, thereby folding the handle and enabling the handle to be stowed under, for example, a base of a boat seat.

Figure 5:
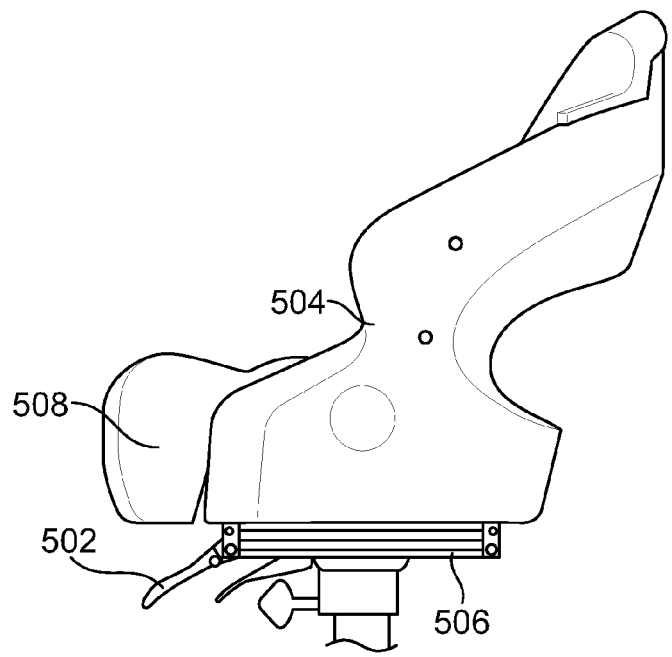
FIG. 5 depicts an example application of the example apparatus.

FIG. 5 depicts an example application for an example handle 502 constructed in accordance with the teachings herein to move or adjust (e.g., slide, raise/lower, etc.) a boat seat 504. The example handle 502 is coupled to an adjustable base 506 that supports the boat seat 504. The handle 502 in this example is made of plastic, but may be made of any other suitable material(s). The base 506 may be made of a durable, corrosion-resistant material (e.g., aluminum) and may be coupled to a variety of boat seat types, which may be made of a variety of materials and/or combination of materials (e.g., plastic, foam, etc.). The boat seat 504 of this example includes a bolster 508, which may either fold down, as shown, or fold up (not shown). When the bolster 508 is folded down, the handle 502 is easily accessible without being in a user's way. When the bolster 508 is folded up, the handle 502 may be moved to a position in which the handle 502 is substantially under the seat 504 and, thus, will not interfere with a person moving around the seat 504.

Figure 6:
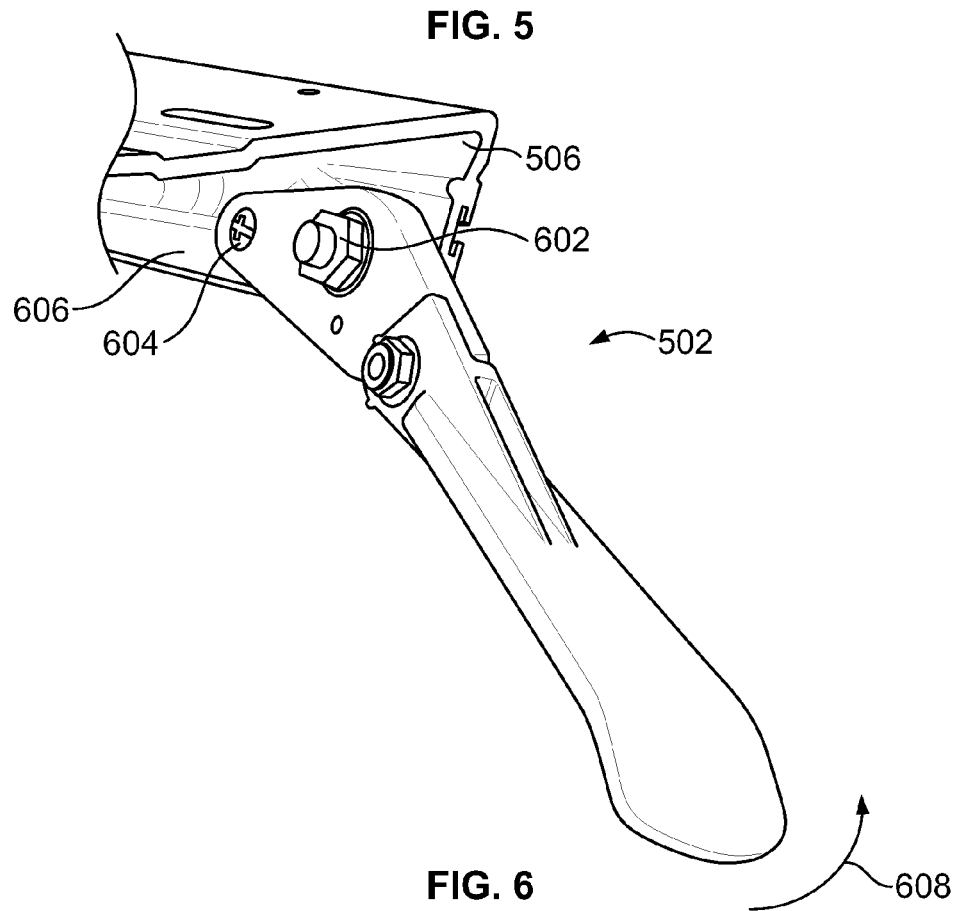
FIG. 6 depicts a detailed view of the example application of the example apparatus.

FIG. 6, which is a more detailed depiction of the example handle 502, shows that the handle 502 is coupled to the base 506 via a first pin 602. The example handle 502 is also coupled, via a fastener 604 (e.g., a screw, a bolt), to a mechanism that allows the base 506 to move. In this example, the mechanism is a slide system 606, operative to enable a user to move the boat seat 504 forward and rearward. When the handle 502 is rotated about the first pin 602 in a first direction 608, the handle 502 applies a force to the slide system 606 to actuate the slide system 606 and enable the boat seat 504 to move. In other examples, the handle 502 may affect the vertical movement of (e.g., raise and lower) or rotational movement of (e.g., swivel) the boat seat 504. Typically, the handle 502 is fully extended, as shown, when the user rotates the handle 502 in the direction indicated by arrow 608 to operate the slide system 606 to move the boat seat 504.

Figure 7:
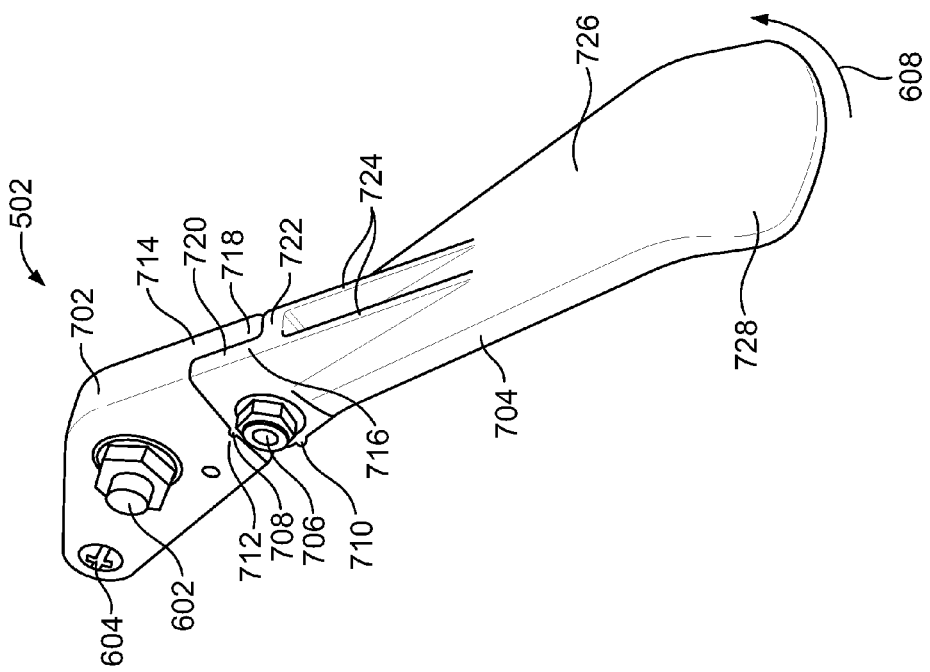
FIG. 7 depicts the example apparatus in a first position.

FIG. 7 depicts the example handle 502 in a first position. As can be seen in FIG. 7, the handle 502 has two portions, a rocker arm 702 and a lever 704. The rocker arm 702 is rotatably coupled to the base 506 via the first pin 602. The fastener 604 couples the rocker arm 702 to the slide system 606 shown in FIG. 6. The rocker arm 702 and the lever 704 are rotatably coupled via a second pin 706 so that the lever 704 may move (e.g., rotate) relative to the rocker arm 702.

In this example, the lever 704 includes a first detent 708 and a second detent 710. The rocker arm 702 includes an indent 712 to receive the detents 708 and 710. Specifically, the first and second detents 708 and 710 engage the indent 712 to hold the handle 502 in first and second positions, respectively. However, other examples may contain one or more detent(s) and one or more indent(s), which may be disposed on either the rocker arm 702 or the lever 704.

FIG. 7 depicts the example handle 502 with the lever 704 in the first position (e.g., fully extended or deployed). In the first position, the extension length of the handle 502 is at a maximum to allow the handle 502 to be easily accessible to a user. The user may put the handle 502 in the first position if, for example, the bolster 508 of the boat seat 504 of FIG. 5 is folded down. The first position also enables the user to operate the slide system 606 to move the boat seat 504 by rotating the lever 704 and rocker arm 702 in the first direction 608. The lever 704 may be held in the first position by engaging the first detent 708 with the indent 712.

The second pin 706, which rotatably couples the rocker arm 702 and the lever 704, is disposed through corresponding holes 916 and 918 (shown in FIG. 9) of a first flange 714 of the rocker arm 702 and a second flange 716 of the lever 704. In the first position, the first and second flanges 714 and 716 overlap, causing a first flat edge 718 of the first flange 714 and a second flat edge 720 of the second flange 716 to meet. Additionally, a surface adjacent the second flange 716 integrally forms a stop 722 to engage the first flange 714. The stop 722 prevents the lever 704 from rotating in the first direction 608 past the first position relative to the rocker arm 702. After the stop 722 engages the first flange 714, further rotation in the first direction 608 will rotate the rocker arm 702 and the lever 704 in unison to cause the rocker arm 702 to actuate the slide system 606. Support ribs 724 are disposed adjacent the stop 722. The support ribs 724 lead away from the second flange 714 and the stop 722 and taper towards a hand grip 726 of the lever 704. The hand grip 726 may include a curved portion 728 to facilitate the user (e.g., a person's hand) gripping the hand grip 726.

Figure 8:
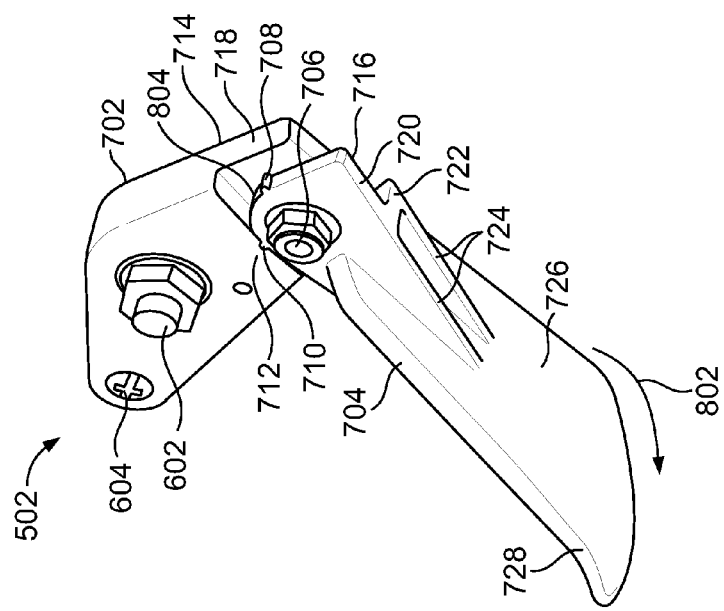
FIG. 8 depicts the example apparatus in a second position.

FIG. 8 depicts the example handle 502 after the lever 704 has been rotated in the second direction 802 to the second position (e.g., a folded or stowed position). The handle 502 may be folded to decrease the extension length of the handle 502 so the handle 502 is stowed under the seat 504 out of the user's way. The user may put the handle 502 in the second position if, for example, the bolster 508 of the boat seat 504 in FIG. 5 is folded up. The lever 704 may be held in the second position by engaging the second detent 710 and the indent 712. When either of the detents 708 and 710 is engaged with the indent 712, the lever 704 may be held in place relative to the rocker arm 702 to prevent the lever 704 from moving, for example, when the boat moves. However, the user may easily apply a sufficient force to move the lever 704 between the first and second positions.

As shown in FIG. 8, the second flange 716 has a curved edge 804 on which the second detent 710 is located. The curved edge 804 enables the lever 704 to rotate about the second pin 706 in the second direction 802 to the second position. When the lever 704 is in the second position, the first and second flat edges 718 and 720 no longer meet.

Figure 9:
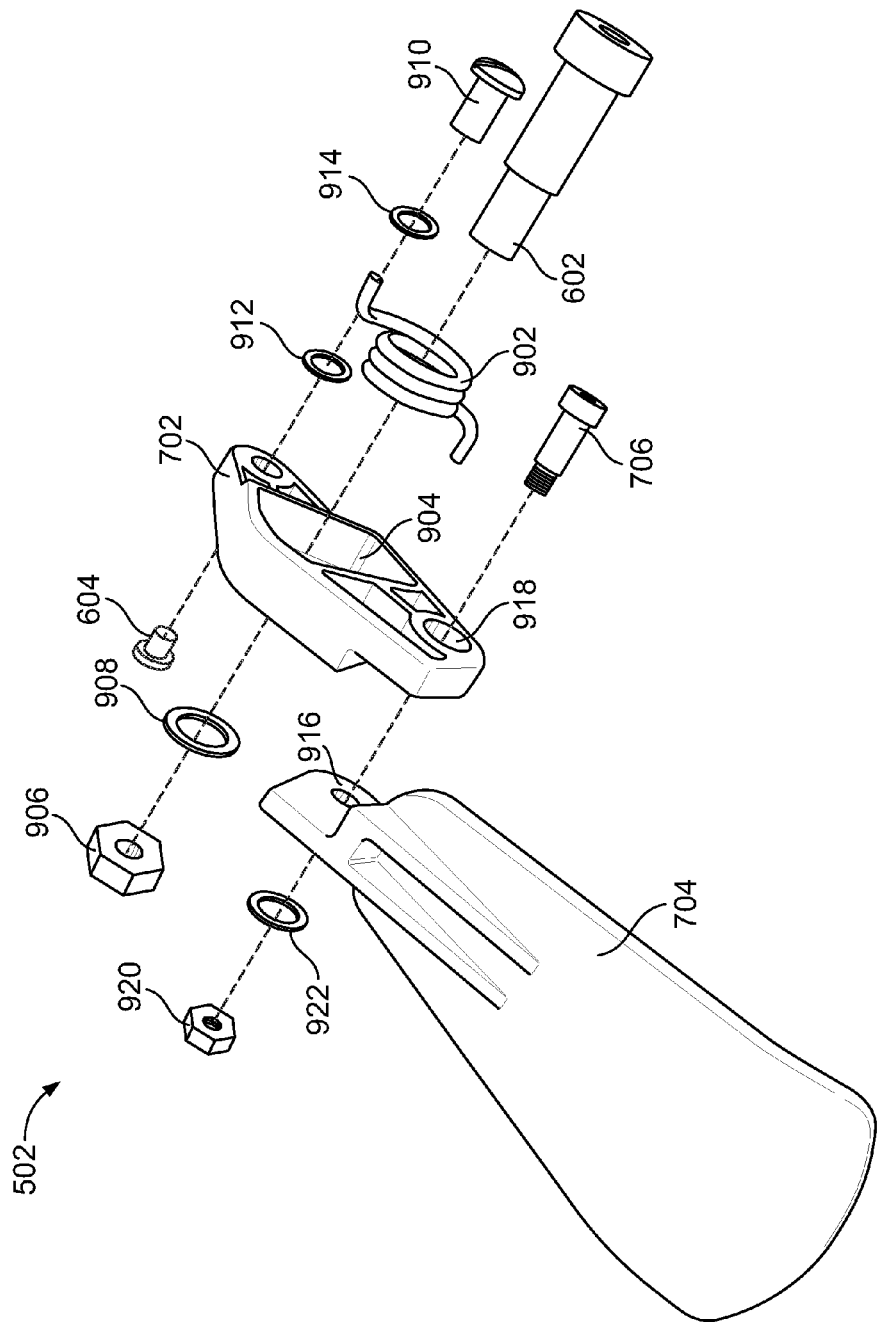
FIG. 9 depicts an exploded view of the example apparatus.

FIG. 9 is an exploded view of the example handle 502, detailing components of the handle 502 such as the first pin 602, the fastener 604 and the second pin 706. The first pin 602, in addition to coupling the handle 502 to the base 506, operatively couples a spring 902 to the rocker arm 702. The spring 902 fits into a cavity 904 of the rocker arm 702. The spring 902 provides a force in the second direction 802 to return the handle 502 to its original position after the user rotates the handle 502 in the first direction 608 to adjust the boat seat 504. A nut 906 is to couple the first pin 602 and the spring 902 to the rocker arm 702. A washer 908 may be disposed between the nut 906 and the rocker arm 702.

The fastener 604 is to couple the slide system 606 (not shown) to the rocker arm 702 via a third pin 910. The slide system 606 may be disposed between the rocker arm 702 and the third pin 910. The slide system 606 may be further disposed between washers 912 and 914. The second pin 706 is operatively coupled to the rocker arm 702 and lever 704 through the holes 916 and 918 via a nut 920. A washer 922 may be disposed between the nut 920 and the lever 704. The washers 908, 912, 914, 922, and any additional washers not shown may be used when assembling the handle 502 to prevent galling of plastic components. The washers 908, 912, 914 and 922 may also be operative to distribute any stress that may occur during the use of the example handle 502.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. An apparatus comprising a handle including a first portion rotatably coupled to a second portion via a pin disposed through corresponding bores of the first and second portions, the first portion including a hand grip, the second portion operatively coupled to an adjustment mechanism, wherein the first portion rotates in a first direction to fold relative to the second portion and the first and second portions rotate together in a second direction to operate the adjustment mechanism.

2. The apparatus as described in claim 1 further comprising a second pin coupling the second portion to a seat base, the first and second portions to rotate around the second pin.

3. The apparatus as described in claim 1 further comprising a fastener coupling the second portion to the adjustment mechanism.

4. The apparatus as described in claim 1 further comprising a first flange formed by the first portion and a second flange formed by the second portion, the corresponding bores disposed through the first and second flanges, wherein the first and second flanges include respective first and second edges, the first and second edges meet when the first portion is rotated in the second direction.

5. The apparatus as described in claim 1 further comprising a spring disposed within a cavity of the second portion, the spring to bias the second portion toward a neutral position.

6. The apparatus as described in claim 1, wherein the adjustment mechanism enables adjustment of a boat seat by sliding the boat seat forward or rearward.

7. The apparatus as described in claim 1, wherein the hand grip includes a curved portion at an end of the first portion.

8. An apparatus comprising:
a lever having a first end to be moved by a person's hand and a second end opposite the first end, the second end having a first bore therethrough; and
a rocker arm having a third end and a fourth end, the third end having a second bore therethrough, the rocker arm rotatably coupled to the lever via the first and second bores so that movement of the lever in a first direction causes the fourth end of the rocker arm to rotate to release a seat adjuster and movement of the lever in a second direction causes the lever to fold relative to the rocker arm.

9. The apparatus as defined in claim 8, wherein the first bore is through a first flange of the second end and the second bore is through a second flange of the third end, the first and second flanges overlapping and a pin disposed through the first and second bores.

10. The apparatus as defined in claim 9, wherein the first flange and the second flange are shaped such that the lever is limited from rotating relative to the rocker arm in the first direction further than a first position of the lever, the first position of the lever being extended relative to the rocker arm.

11. The apparatus as defined in claim 8 further comprising a pin rotatably coupling the rocker arm to a seat base, the pin disposed between the third and fourth ends of the rocker arm.

12. The apparatus as described in claim 8 further comprising at least one indent on the third end of the rocker arm and at least one detent on the second end of the lever, wherein the at least one indent and the at least one detent engage to hold the lever in position relative the rocker arm.

13. The apparatus as described in claim 8 further comprising a fastener disposed at the fourth end of the rocker arm coupling the rocker arm to the seat adjuster.

14. The apparatus as described in claim 8 further comprising a spring disposed within a cavity of the rocker arm, the spring to return the rocker arm to a neutral position after the lever and the rocker arm are rotated in the first direction.

15. An apparatus comprising:
means for adjusting a boat seat;
means for operating the means for adjusting the boat seat, the means for operating including a first portion and a second portion, the first portion including means for rotating the second portion, the first and second portions further including means for folding the first portion relative to the second portion.

16. The apparatus as described in claim 15 further including means for maintaining a position of the means for operating.

17. The apparatus as described in claim 16, wherein the means for maintaining a position biases the means for operating toward a neutral position.

18. The apparatus as described in claim 16, wherein the means for maintaining a position maintains one of a first position and a second position of the first portion relative to the second portion.

19. The apparatus as described in claim 18, wherein the means for maintaining a position includes a first means for engagement and a second means for engagement, the first means for engagement disposed on the first portion and the second means for engagement disposed on the second portion.

20. The apparatus as described in claim 15, wherein the means for rotating is disposed at a first end of the first portion, the means for rotating to facilitate a grip by a hand.

\* \* \* \* \*